United States Patent [19]

Andrew et al.

[11] Patent Number: 5,502,762
[45] Date of Patent: Mar. 26, 1996

[54] SYSTEM AND METHOD FOR SIMULTANEOUSLY CONTROLLING RINGING AT LOCAL AND REMOTE TELEPHONES

[76] Inventors: Brian J. Andrew; Jo E. Andrew, both of 4401 Southgate, Plano, Collin County, Tex. 75024

[21] Appl. No.: 258,343

[22] Filed: Jun. 10, 1994

[51] Int. Cl.$^6$ .............................. H04M 3/56; H04M 3/42
[52] U.S. Cl. ...................... 379/202; 379/210; 379/211; 379/212; 379/204
[58] Field of Search ................................ 379/202, 203, 379/204, 205, 211, 212, 210

[56] References Cited

U.S. PATENT DOCUMENTS

| | | | |
|---|---|---|---|
| 3,441,678 | 4/1969 | Budlong et al. | 179/18 |
| 3,627,955 | 12/1971 | Stone, Jr. et al. | 379/204 |
| 3,959,600 | 5/1976 | Sousa | 379/211 |
| 4,027,109 | 5/1977 | Smith et al. | 379/210 |
| 4,060,700 | 11/1977 | Magnusson | 379/204 |
| 4,266,098 | 5/1981 | Novak | 379/199 |
| 4,475,193 | 10/1984 | Brown | 379/202 |
| 4,611,095 | 9/1986 | LeBlanc et al. | 379/203 |
| 4,670,628 | 6/1987 | Boratgis et al. | 379/211 |
| 4,724,539 | 2/1988 | Hiskes | 379/205 |
| 4,737,982 | 4/1988 | Boratgis et al. | 379/202 |
| 4,754,478 | 6/1988 | Leibersberger et al. | 379/204 |
| 4,768,221 | 8/1988 | Green et al. | 379/211 |
| 4,782,510 | 11/1988 | Szlam | 379/88 |
| 4,807,279 | 2/1989 | McClure et al. | 379/211 |
| 4,893,335 | 1/1990 | Fuller et al. | 379/355 |
| 5,077,789 | 12/1991 | Clark, Jr. et al. | 379/211 |
| 5,168,517 | 12/1992 | Waldman | 379/205 |
| 5,206,901 | 4/1993 | Harlow et al. | 379/211 |
| 5,222,123 | 6/1993 | Brown et al. | 379/57 |
| 5,243,642 | 9/1993 | Wise, Jr. et al. | 379/211 |
| 5,432,845 | 7/1995 | Burd et al. | 379/207 |

*Primary Examiner*—Jeffery Hofsass
*Assistant Examiner*—Parag Dharia
*Attorney, Agent, or Firm*—Fulbright & Jaworski

[57] ABSTRACT

There is disclosed a method and system for redirecting a telephone call incoming to a first line to a selected one or more second lines. In operation, ringing signals initially applied to the first line by the central switching network are inhibited and instead a three-way calling connection is established to the second telephone. Ringing signals applied to the second telephone from the second network connection are detected and cause ringing signals to be applied to the first telephone substantially concurrently with the application of ringing signals to the second telephone. The system is controlled by a processor located in physical proximity to the first telephone.

23 Claims, 4 Drawing Sheets

SYSTEM AND METHOD FOR SIMULTANEOUSLY CONTROLLING RINGING AT LOCAL AND REMOTE TELEPHONES

TECHNICAL FIELD OF THE INVENTION

This invention relates to telephone call devices and more particularly to a telephone connection device that will simultaneously ring an attached local telephone as well as a selected remote telephone, such as a cellular telephone, whenever an incoming call is directed to the local telephone.

BACKGROUND OF THE INVENTION

A common problem facing telephone users today is that they are using many different telephones, each with a different directory number, to receive their calls. The problem is compounded by the fact that many of these numbers are connected to dissimilar systems. The classic illustration of this is when a person uses a wireless (or cellular) phone, an office phone, and a home phone. Other parties don't know which number to call that person on to actually get that person immediately. As wireless (or cellular) telephone technology improves, the coverage is getting more comprehensive, the service is becoming more affordable, and the cellular phone is beginning to become the first choice of telephone numbers at which a person can be reached. Unfortunately, it is not the phone number that is published in the Yellow Pages or the White Pages and, therefore, it is not the phone number by which a person is generally identified. It is an unlisted number given by the cellular service company and because of the per-minute cost to the user, the user is very selective about making the number available to others. The problem, then, is to allow a caller to call just one (primary) phone number, the existing one that is published on business cards and in the Yellow Pages or the White Pages, and nonetheless reach the called person on a second phone, such as their cellular phone, as well as on the primary listed phone.

The basic telephone system is designed to route a single call to a single phone number. The telephone switching network can be modified to ring two phone numbers with one call. But, in the industry today, the only way to do that is to have a third number allocated which people then call and, within the complex network of the centralized system, a service control point actually receives that call and then generates two new calls on the network. So, instead of having one call from one person to another, one now has one call to a machine, which then generates two new calls, so that there are three phone calls on the network. All of these network resources are held up while two phones are ringing until one is answered, and then the telephone system reverts back to one caller, one phone number. This method of connection also requires the use of a database to store information pertaining to the called customer and to complete the transaction.

This method is very expensive because of the needed central office equipment. Also, there are standards yet to be written to allow a central service to generate two calls from one. Thirdly, there are costs due to the administration of the database. This follows since the central computer must know the two phone numbers that the incoming call is trying to reach. The incoming call needs to be triggered in such a way that it is not routed directly to either phone number. It must be put on hold and the information routed to the computer to fetch the two needed phone numbers.

SUMMARY OF THE INVENTION

The foregoing problems are solved by letting the telephone network deliver the call as it does best; by directing the calling telephone to the actual called phone. The incoming calling signal is delivered to the actual called "local" phone number, but the present invention is placed in between the "local" called phone and the incoming telephone subscriber line at the "called" number end. At that point, the telephone network has its resources connected as it would to deliver a phone call to one number. Then, using a network resource that is standard now in almost all telephone exchanges, the present invention initiates a three-way call (or conference call) wherein a second "remote" telephone number, stored in the present invention, is dialed. The incoming call is put on hold, the remote phone number is dialed very quickly. The original call and the conference call are bridged so that the caller, instead of hearing the original ringing cadence at the local phone will now hear the remote phone number's ringing cadence. Thus, the caller hears a ringing phone at the number originally called, however, this ringing is being controlled by the conference call connection, and not by the original called line. The present invention also rings the originally called local phone while the phone network is ringing the remote phone number, so that both phones are ringing at the same time.

If the local phone is answered first, the call is immediately connected to that phone and the conference bridge is dropped. If the remote phone is answered first then, the present invention stays on the line in a supervisory fashion to keep the conference open and monitor the call until finished, whereupon the present invention will drop the conference bridge, hang up, and wait for the next incoming call to the local phone.

The present invention also has other features to properly connect calls. If the remote phone number is answered, then the local phone can be locked out by pressing "##9" (or any designated combination) on the remote phone. The local phone will then hear only a busy tone. A third person cannot eavesdrop on the call. If "##9" is not invoked, one can still have a three-way call. Then, if somebody picks up the local phone, he or she can join the conference call in progress.

Another function of the present invention is that if the local phone is answered, one can again press "##9" on the local phone and thereby invoke a three-way conference call. The present invention will then invoke the dual ringing function and will call the remote phone using the conference call feature. The person on the local phone can then answer the remote phone (i.e., their cellular phone), hang up the local phone and carry on the conversation without having to dial a new phone number or disconnect temporarily.

Similarly, if one is talking on the remote cellular phone and then enters the home or office where the local phone is located, one can pick up the local phone and hang up the remote cellular phone and continue the call. In this manner, the two phones (remote and local) seem to be extensions on the same phone line.

Another feature of the invention is that it need not be located on the subscriber's premises but could in fact be anywhere between the local phone and the switching network as long as the present invention has access to the subscriber line for the local phone. Another feature of the invention is that no additional line resources are required in that the second line is called by invoking a three-way conference bridge which exists today in the telephone switching network. In an alternate embodiment, a person could connect the present invention to two separate local lines and avoid the conference call feature. This, however, will require a second resource which is not necessary in our preferred embodiment and is also more expensive since the cost of two phone lines at a subscribers home or office exceeds the cost of a single phone line with a conference call feature.

The present invention is superior to call forwarding, also. When a person uses call forwarding, the telephone network delivers the call to the local telephone line, is interrupted by the call forwarding feature, and then reroutes the call to the new number. The local telephone does not ring. A person must remember to turn on the call forward feature in order to send calls to the second number and must also remember to disable it when returning to the first number, or else no calls will arrive at the first number. Research has shown that people very often forget, and two or three days may pass before they realize they are not receiving phone calls. With the concurrent ringing feature of the present invention, both phones always ring without any invocation of a function. Once the invention is in place in the local telephone line, the two phones will behave just like two extension phones that are connected to the same subscriber line.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
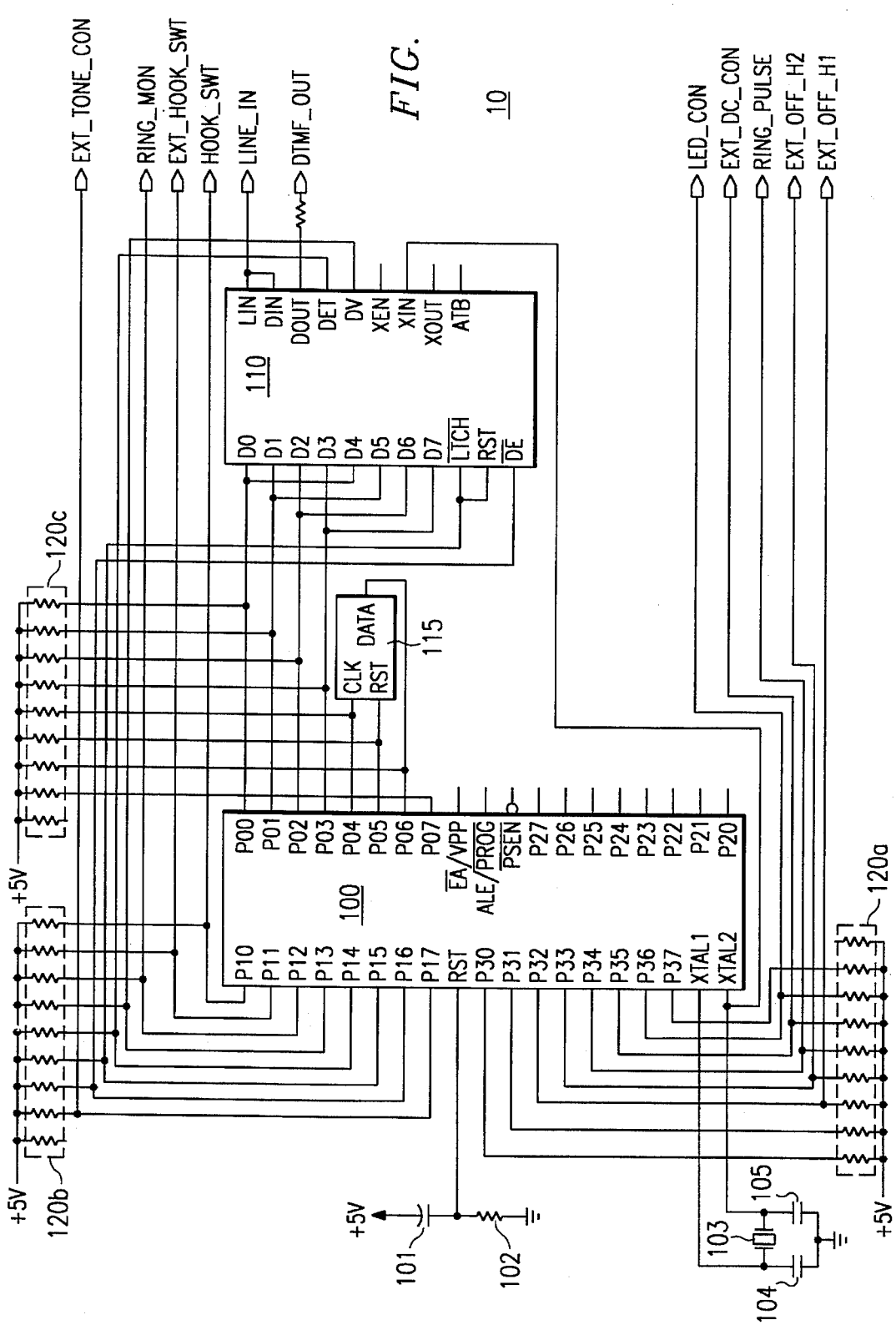
FIG. 1 shows the microprocessor which controls all of the functions of the present invention. The microprocessor is also connected to and interacts with a microcircuit which monitors the subscriber's phone line and generates DTMF tones.

FIG. 1 shows system 10, controlled by processor 100 which, in a preferred embodiment, is driven by crystal isolator circuit 103 and associated capacitors 104 and 105 at a rate of 3.579545 megahertz. Processor 100 is connected to DTMF transceiver 110 and nonvolatile RAM 115. Nonvolatile RAM 115 stores one or more telephone numbers corresponding to one or more remote telephones associated with the telephone number of the subscriber line to which the present invention and the local phone are connected. Nonvolatile RAM 115 is also used to store programmable variable data related to the functions of the present invention, such as a variable time period for "flash hooks" on the subscriber telephone line and a unique I.D. number used to derive an access security code.

Processor 100 can be implemented in numerous embodiments. In a preferred embodiment of the present invention, processor 100 is a controller that contains a microprocessor and an embedded ROM on the same chip due to the low cost of such devices. The processor 100 used in the preferred embodiment is a general purpose microprocessor made by numerous electronics manufacturers. It is a member of the Intel 8051 family of microcircuits. The DTMF transceiver 110 in a preferred embodiment is a highly integrated telephone DTMF transceiver with energy detector by Silicon Systems. The DTMF transceiver 110 is capable of monitoring energy on the telephone lines as well as receiving and generating DTMF tones.

Alternate embodiments of the present invention may utilize microprocessor chips connected to external memories such as ROMs, nonvolatile RAMs or removable PROMs. Other embodiments of the present invention may employ controllers that contain an internal microprocessor and an internal nonvolatile RAM. For the purposes of this disclosure, the controller used in the preferred embodiment will be referred to as "processor 100."

Also shown in FIG. 1 are pull-up resistors 120a–120c, which terminate the output pins of processor 100, DTMF transceiver 110 and nonvolatile RAM 115. Capacitor 101 and resistor 102 hold microprocessor in the reset mode after power is applied to the present invention for a brief period of time determined by the RC time constant of resistor 101 and capacitor 102.

Figure 2:
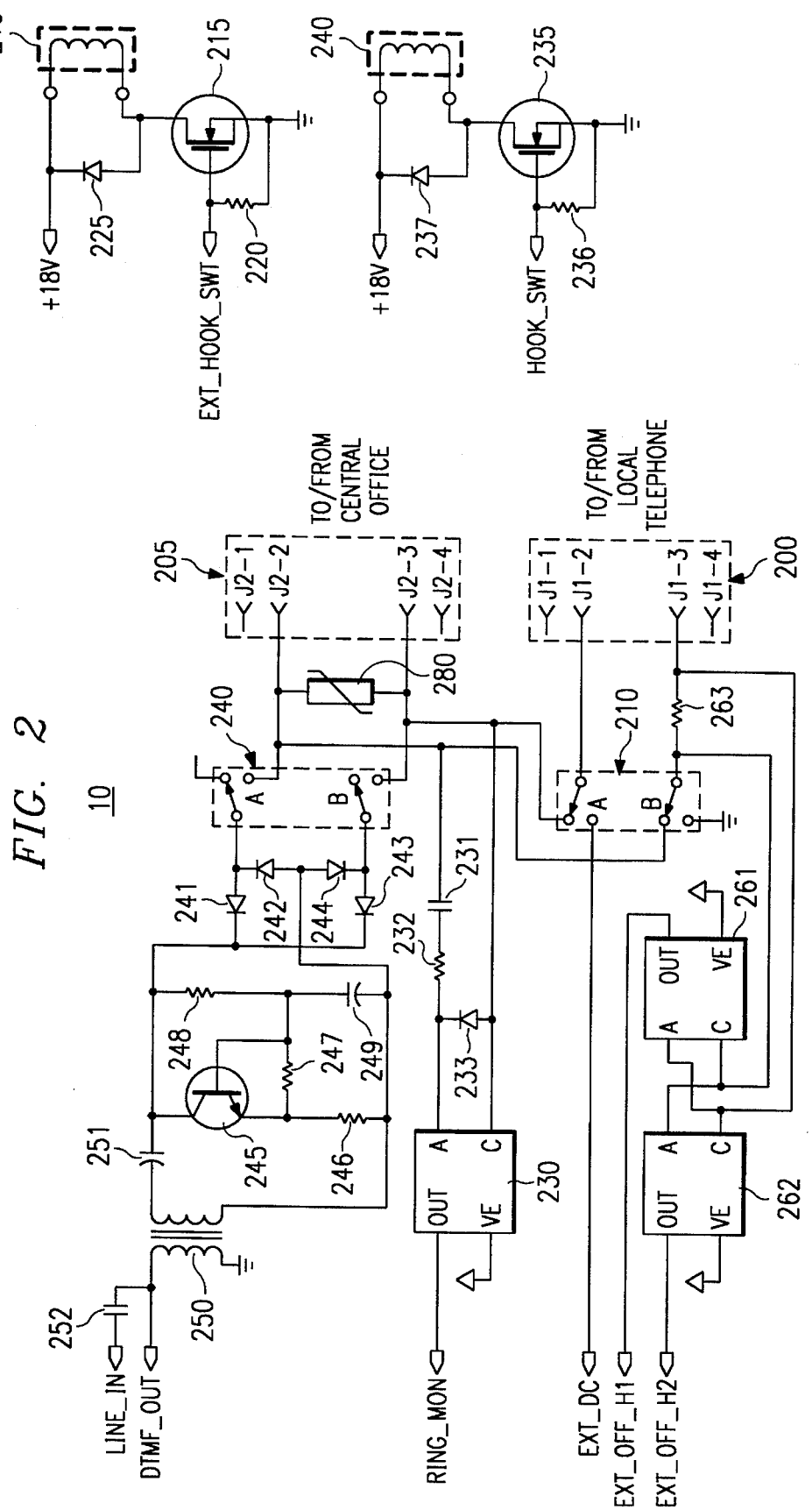
FIG. 2 shows the principal connectors of the present invention and the switching and detection circuitry which interfaces between the microprocessor shown in FIG. 1 and the attached phone and subscriber phone line.

FIG. 2 shows the two primary connections to the present invention, connector 200 (J1) and connector 205 (J2).

Figure 3:
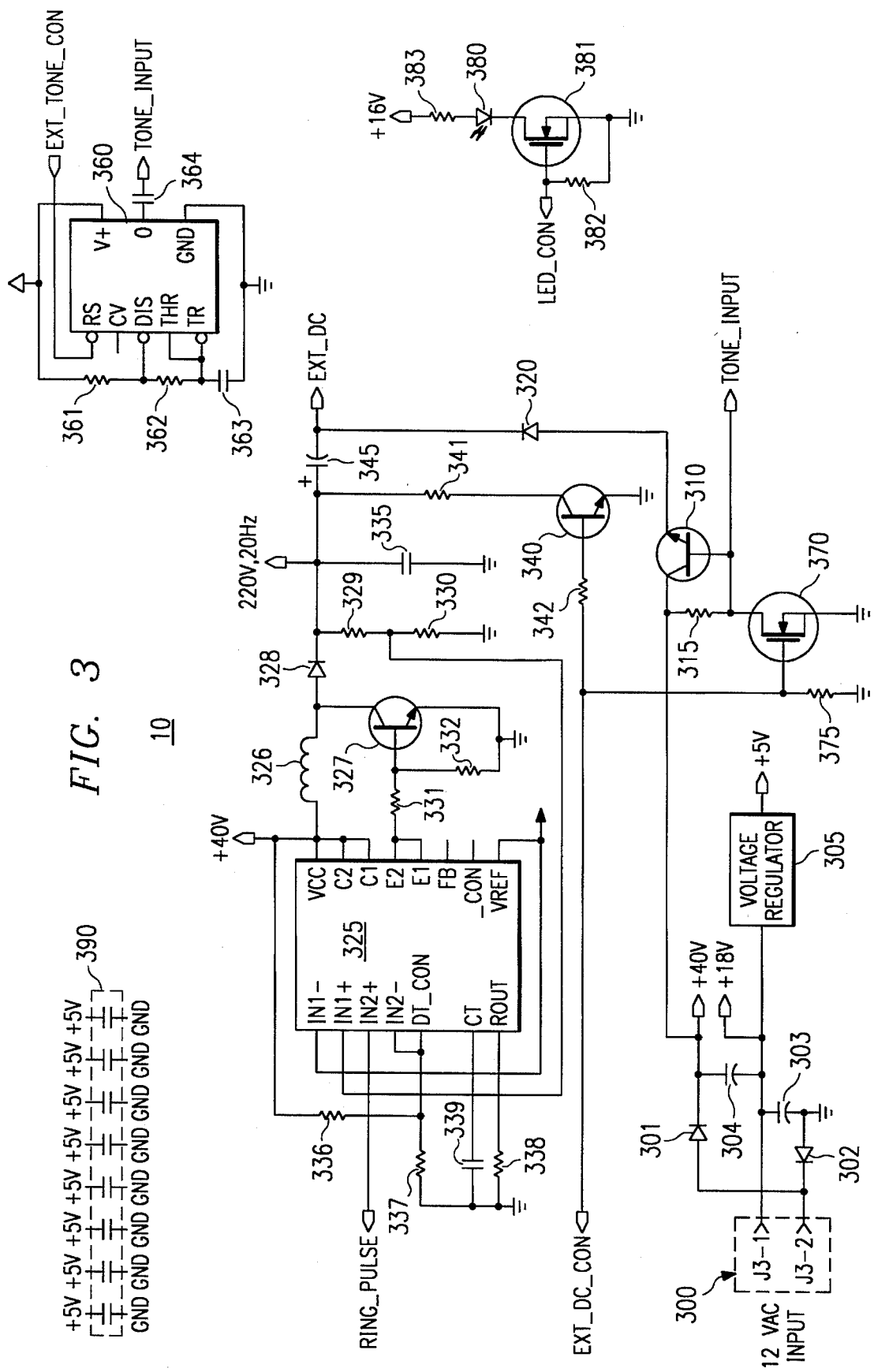
FIG. 3 shows the internal power supply of the present invention as well as circuitry for generating dial tone, a busy signal and ringing voltage for the attached phone.

FIG. 3 shows connector 300 (J3) which is the primary power supply input to the present invention.

Figure 4:
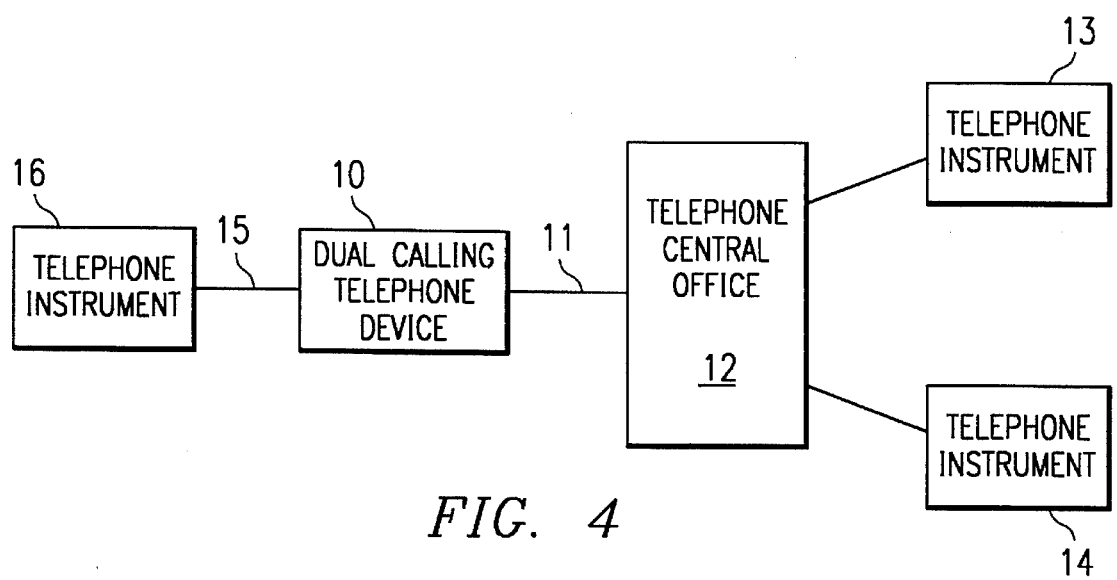
FIG. 4 shows the present invention connected to a subscriber line and a telephone instrument.

FIG. 4 shows system 10 of the present invention connected to subscriber 11 to the central office 12 of the telephone system. Telephone instrument 13 may generate incoming calls to the system 10 of the present invention or may receive calls from the local telephone 16 attached to the system 10 of the present invention. System 10 is connected by telephone wire 15 to a telephone instrument 16. Telephone instrument 14 is the remote telephone to which system 10 of the present invention sends outgoing telephone calls whenever system 10 invokes a three-way conference call to the telephone number stored in the memory of system 10. Telephone instruments 13, 14 and 16 may be standard voice telephones, answering machines, pagers, beepers, facsimile machines, cellular telephones, or computer devices capable of interfacing with the telephone system, such as by means of a MODEM.

Returning now to FIG. 2, connector 205 is the input connection of the present invention to which the existing telephone subscriber line from the telephone network is connected. When power is not connected to connector 300 of the present invention, relay 210 is de-energized and pins J2-2 and J2-3 of connector 205 are connected directly to pins J1-2 and J1-3 of connector 200, which are the connection pins for the local phone that is connected to the present invention. In other words, when no power is supplied to the present invention or it is turned off, the subscriber telephone line is connected directly to the local phone attached to the present invention by providing a short circuit from connector 205, pins J2-2 and J2-3, to connector 200, pins J1-2 and J1-3. In this mode, the present invention is invisible to the external telephone network and the local phone.

The voltage input on the J3 connector is a 12 VAC waveform that is generated by a stepdown voltage transformer that is plugged into a standard wall outlet. When power is applied to connector 300, diodes 301 and 302 in conjunction with capacitors 303 and 304 rectify and store the input voltage on connector 300 to produce a +18 VDC source and a +40 VDC source within the present invention. The rectified +18 VDC that appears across capacitor 303 is the input to voltage regulator 305. Voltage regulator 305 produces a +5 VDC output used to power several of the integrated circuits of the present invention. Power supply capacitors 390, shown in FIG. 3, are connected between the +5 VDC source and ground to filter high frequency noise from the +5 VDC source.

Immediately after power up, processor 100, shown in FIG. 1, is initially held in the reset position by capacitor 101 and resistor 102. When voltage regulator 305 generates +5 VDC, one side of capacitor 101, which is connected to the +5 VDC plane of the present invention, is raised immediately to 5 volts. Initially, there is no voltage across capacitor 101. Therefore, the other side of capacitor 101 is also raised to 5 VDC by voltage regulator 305 when power is applied. Capacitor 101 begins to charge through resistor 102 immediately. The side of capacitor 101 which is connected to resistor 102 is also connected to the reset (RST) input of processor 100. Upon power up, the RST input to processor 100 is set to 5 volts and processor 100 is held in a reset mode. As capacitor 101 charges through resistor 102, the voltage on the RST input to processor 100 drops to zero and processor 100 is no longer held in the reset mode. The delay time for the reset to drop off on the RST input of processor 100 is determined by the RC time constant of capacitor 101 and resistor 102.

When the reset is released, processor 100 immediately begins to run a software routine stored in embedded ROM in processor 100. In alternate embodiments, processor 100 may operate under control of software in an external ROM or RAM. The source code of the embedded software of processor 100, written in BASIC, is listed in Appendix A of this application. The source code shown in Appendix A is compiled into object code and the object code is programmed into the embedded ROM of processor 100.

Part of this embedded software is an initialization routine that sets the logic levels on the output pins of processor 100. Processor 100 is driven by crystal oscillator 103 and capacitors 104 and 105 at a rate of 3.579545 megahertz to produce very accurate telephone ringing cadences and "flash hook" time delays. At the end of the initialization routine of processor 100, the output pin which generates the signal EXT HOOK SWT (or Extension Hook Switch) is set to logic "1", or 5 volts. The signal EXT HOOK SWT turns on transistor 215, which is connected to biasing resistor 220. When transistor 215 is turned on, current is drawn through relay 210 from the +18 VDC source and the internal switches A and B of relay 210 switch over to the internal DC power of the present invention, labeled EXT DC (or Extension DC) as shown in FIG. 2. In this position the local phone is no longer connected directly to the subscriber telephone line. This is done to prevent the local phone from ringing immediately when an incoming call is received by the present invention over the subscriber telephone line on connector 205. Internal +40 V power is provided to connector 200 from the signal EXT DC through transistor 310 in FIG. 3. Resistor 315 supplies base current to transistor 310 to bias transistor 310 on and drive current through diode 320 to the signal EXT DC in FIG. 3.

Connector 205 is a standard two wire interface and is connected to optical coupler microcircuit 230. Optical coupler 230 is coupled to connector 205 by capacitor 231, resistor 232, and diode 233 and monitors the subscriber line for the 220 volt ringing energy that the central office of the telephone network sends to the subscriber line to initiate a phone call. Optical coupler 230 is an optical coupling device which provides circuit isolation in order to comply with an FCC regulation that requires that all telephone lines be isolated from devices connected to the phone line. Varistor 280 provides further over-voltage protection from large voltage spikes in the external telephone system that may appear at connector 205.

When power is applied to the present invention and the local phone is not in use (hung up), relay 210 is in the open position. In this situation, the local phone, through the present invention, does not draw any power down from the subscriber line and, as far as the central office is concerned, the local phone is not in use and a call may be received on the subscriber line.

When a ringing cadence is received on connector 205 from the subscriber line, optical coupler 230 generates an active pulse on the signal line RING MON which is connected to pin 3 of processor 100 in FIG. 1. On the very first rising edge of the ring pulse from optical coupler 230, the processor 100 begins execution of a program stored in its embedded ROM that answers the incoming call.

The first function performed by processor 100 is to take the local subscriber line connected to connector 205 off-hook. To do this processor 100 drives the output signal HOOK SWT high, which turns on transistor 235, which in turn activates (closes) relay 240. When relay 240 is closed, current may be sent through diodes 241–244 to drive transistor 245 and the associated resistors 246–248 and capacitor 249. When relay 240 is closed and the ringing cadence on connector 205 drives transistor 245, the increased draw of current by the present invention gives the appearance that the local telephone has been answered immediately and the central office of the telephone system stops the ringing cadence.

The incoming call at this point is completely connected to the present invention. However, the detection of the input ringing by optical coupler 230 and processor 100, and the closing of relay 240, occurs so fast that the person calling the subscriber line does not hear the ringing cadence and is unaware that their call,has been connected to the subscriber's line.

Next, processor 100 places an outgoing call to the remote telephone by invoking the conference call feature of the subscriber's phone line. Processor 100 delays briefly, for about 15 milliseconds for example, to allow the central office to realize that the incoming call has been answered on the subscriber line. At the end of this delay, processor 100 uses the signal HOOK SWT to invoke a hook flash on relay 240. The hook flash lasts approximately 750 milliseconds. This means that processor 100 stops drawing current through relay 240 for approximately 750 milliseconds, then draws current again, thereby signalling the central office that the subscriber line wishes to invoke a three-way, or conference, call. At that point, the central office of the telephone system puts the calling party on hold without the calling party realizing it, and then sends dial tone back down the subscriber line to the present invention.

The dial tone sent to the subscriber line is received on connector 205 and is sent through relay 240 to transformer 250 by means of coupling capacitor 251. The dial tone then passes to the other side of transformer 250 and becomes the signal LINE IN which is connected by coupling capacitor 252 to DTMF transceiver 110 in FIG. 1. When DTMF transceiver 110 detects a dial tone on signal LINE IN, DTMF transceiver 110 informs processor 100 of this fact on a four bit bus that is connected to pins D0–D3 of transceiver 110. When processor 100 receives the signal from transceiver 110 that a valid dial tone has been received, processor 100 sends back a signal to transceiver 110 which causes it to dial a predetermined phone number. The predetermined phone number is the phone number of the remote phone which the present invention is designed to ring (i.e., the cellular phone or office phone of the subscriber). The predetermined phone number is stored in nonvolatile RAM 115.

DTMF transceiver 110 dials the remote phone on the output line DTMF OUT which drives the subscriber line through transformer 250 and relay 240. The standard for telephone lines today allows for DTMF tones to be "on" for 25 milliseconds and "off" for 25 milliseconds. The present invention uses more generous tolerances, so that the DTMF tones are on for 50 milliseconds and off for 50 milliseconds. Processor 100 will then initiate a wait period of between 50 and 60 milliseconds to allow the telephone network to accept the outgoing phone number of the remote phone, realize that the present invention has finished dialing, and thereafter place the call to the remote phone.

When DTMF transceiver 100 has finished dialing, the present invention does not need to wait until the outbound call is placed. As far as the present invention is concerned, the second call is valid as soon as transceiver 110 is finished dialing. Processor 100 will then invoke another flash hook signal to relay 240 and thereby bridge the two calls. Once the two calls are bridged, the person who placed the call to the subscriber line is connected while the central office continues to place the outbound phone call to the remote phone number. When the central office completes the connection to the remote telephone and begins a ringing cadence of the remote telephone, the person who placed the call to the subscriber phone line will hear the ringing cadence of the remote telephone, but will assume that he has merely reached the local telephone and that the ringing cadence corresponds to the local phone.

At the same time, however, DTMF transceiver 110 is still monitoring the signal LINE IN and will detect the ringing cadence of the remote phone through transformer 250. The ringing cadence of the remote phone is transmitted from DTMF transceiver 110 to processor 100. Processor 100 will then cause the local phone on connector 200 to ring by generating the signal RING PULSE which creates a 220 volt, 20 Hz ringing cadence on the signal EXT DC and sends it through relay 210 to the local phone. The signal RING PULSE is applied to an input pin on microcircuit 325, which is a pulse-width modulator power supply step-up. Power supply step-up 325 boosts the 40 volt power supply to over 200 volts by generating voltage spikes across inductor 326. To do this, power supply step-up 325 drives large bursts of current through inductor 326, which in turn create large voltage spikes at the collector of transistor 327.

The voltage spikes at the collector of transistor 327 drive current through diode 328 and resistors 329 and 330. Resistor 329 has a value of 220 kilohms and resistor 330 has a value of 5 kilohms in a preferred embodiment of the present invention. The midpoint of resistor 329 and resistor 330 is fed back to the input pin IN1– of power supply step-up 325.

The output pin VREF of power supply step-up 325 outputs a 5 volt reference which is fed back to pin IN1+ of power supply step-up 325. If the combined voltage across resistors 329 and 330 rises above 225 volts, the voltage at the midpoint between resistors 329 and 330 will rise above the 5 volt reference source. When this condition occurs, power supply step-up 325 will increase the voltage on output pins E2 and E1, thereby driving current through resistors 331 and 332 and turning on transistor 327. When transistor 327 turns on, it draws current away from diode 328 and reduces the voltage level on the collector of transistor 327.

The net effect of this feedback is to clip the total voltage across resistors 329 and 330 at 220 volts. Thus, the 20 hertz pulse train that is input from the signal RING PULSE produces a 220 volt, 20 hertz pulse train across capacitor 335. To insure that the train of pulses across capacitor 335 have sharp falling edges, processor 100 drives the signal EXT DC CON to a logic "1", thereby driving current through resistor 342 and biasing on transistor 340, which draws current through its collector and resistor 341 which, in turn, will rapidly draw current out of capacitor 335. The current drawn through resistor 341 rapidly reduces the 220 volts across capacitor 335 on the trailing edge of each pulse in the 220 volt, 20 hertz pulse train. Additionally, the signal EXT DC CON drives current through resistor 375 and turns on the gate of transistor 370. Transistor 370 then draws current through resistor 315 and pulls the base of transistor 310 low in order to turn it off. Turning off transistor 310 pulls down the DC voltage at the emitter of transistor 310 from 40 VDC to less than 1 VDC. This prevents the 40 VDC signal at EXT DC from clipping the bottom of the 220 volt, 20 hertz pulse train at 40 VDC.

The 220 volt, 20 hertz pulse train, is capacitively coupled to the signal EXT DC by electrolytic capacitor 345. Capacitor 345 has a value of 10 microfarads, which is effectively a DC short to the 20 hertz pulse train. The 220 volt, 20 hertz pulse train at signal EXT DC passes through relay 210 to the local phone to provide it with a ringing cadence. This cadence is turned on for one second and off for two seconds, which is the ringing cadence that one normally hears from a telephone. Alternatively, the embedded ROM routine in processor 100 may be modified to give any ringing cadence that the listener may want to use to alert the listener to the fact that the local phone is concurrently being rung.

Processor 100 is in complete control of the ringing cadences. By selectively programming the nonvolatile RAM 115, the user may obtain quicker rings, shorter rings, or longer rings. In any event, this ringing cadence is sent through connector 200 to the local phone by the present invention, but is not sent out to the subscriber line through connector 205.

At this point, a stable state is reached wherein the remote phone and the local phone are both being rung and neither phone has been answered yet. Microcircuit 100 is still monitoring the subscriber line to the remote phone to detect if that telephone is answered first. Likewise, the local phone, on connector 200 is monitored on pin J1-3 by optical coupling microcircuits 261 and 262 which are monitoring resistor 263 for a DC voltage which would indicate that the local phone has been answered.

If the local phone is answered, current is drawn down from the 40 V volt supply. Either optical coupler circuit 261 or 262 will detect a voltage across resistor 263 and one of them will inform processor 100 on signal line EXT OFF H2 or EXT OFF H1. Two optical coupler circuits are used because the polarity of the current used in the telephone network may be different than the polarity used in the present invention. Either optical coupler 261 or 262 will detect current regardless of its polarity. When processor 100 detects a signal from the optical couplers 261 or 262 indicating that the local phone has been answered, processor 100 again invokes a flash hook on relay 240 in order to discard the three-way or conference call. The flash hook is sent out on the subscriber phone line through connector 205 and is detected by the telephone network, which will thereafter drop the conference call to the remote telephone and stop the ringing cadence to the remote telephone.

After a delay of approximately 700 milliseconds, processor 100 will drive low the signal EXT HOOK SWT, thereby de-energizing relay 210. When relay 210 is de-energized, connector 200 is again shorted to connector 205 so that the local phone is directly connected to the subscriber line. The present invention then switches into a mode which simply monitors the current through resistor 263, using optical couplers 261 and 262. The current that is now going through resistor 263 is the network power which comes in on connector 205 and goes through relay 210 to connector 200 and out to the local phone on pin J1-2. The current then returns from the local phone on connector J1-3 and passes through resistor 263. When the person answering the local phone finishes their call and hangs up, the current through resistor 263 will drop off to zero and either optical coupler 261 or 262 (depending on network polarity) will relay this information to processor 100. When processor 100 senses that the local phone has been hung up, processor 100 de-energizes relay 240 (so that DTMF transceiver 110 is no longer monitoring the signal LINE IN) and then energizes relay 210 (so that the local phone connected on connector 200 is no longer directly connected to connector 205, the subscriber line). The present invention will then have returned to the state it was in prior to receiving the incoming call on the subscriber line.

It is important to note that relay 240 could have been released earlier by processor 100 but in a preferred embodiment of the present invention this is not desirable because it eliminates the ability of the user of the present invention to transfer calls to and from either the local or remote telephone, depending on which one the user is operating. The present invention maintains the closure of relay 240 so that DTMF transceiver 110, through transformer 250 can continually monitor the incoming phone line on connector 205 and the local phone on connector 200 to detect the presence of DTMF tones from either connector. By monitoring connectors 205 and 200 with relay 240, the present invention is able to detect the pressing of certain DTMF key patterns by the telephone user that invoke numerous functions of the present invention.

For example, a user of the present invention who is speaking on the local phone may transfer the phone call to the remote phone (i.e., the cellular phone) by pressing the buttons "##1" (or some other pattern) on the local phone's key pad. When DTMF transceiver 110 detects these DTMF tones on the phone line through relay 240 and transformer 250, transceiver 110 relays these DTMF inputs to processor 100 which compares them to predetermined values stored in embedded ROM in order to determine what function processor 100 must perform. Processor 100 will then determine that "##1" (or some other combination) corresponds to a transfer of the presently active phone call from the local phone to the remote phone, and will again invoke the conference call feature of the present invention. There is nothing inherently significant in the keystroke combination "##1", since any predetermined combination of keystrokes stored in embedded ROM will suffice to invoke a given function of the present invention.

The foregoing example illustrated the situation where the local and not the remote phone was answered by the subscriber. In the situation where the local phone was picked up first, the drawdown of current through connector 200 was detected across resistor 263 to alert processor 100 to the fact that the local phone had been picked up first. In the situation where the remote phone is picked up however, the situation is somewhat more complicated. The current North American telephone system does not have delivered call supervision wherein the telephone network sends a signal to a calling telephone whenever the called telephone or called device has been answered. Therefore, when the remote phone, whether a cellular phone or an office phone, is answered, there is no indication on the subscriber line on connector 205 that this connection has been made. To detect whether or not the remote phone has been answered, the present invention monitors connector 205 through relay 240, transformer 250 and DTMF transceiver 110 to detect a change in the stable energy state on the subscriber phone line.

The present invention uses transceiver 110 to monitor the signal line LINE IN for the cadence of the ringing tone on the remote telephone. The ringing cadence of the remote telephone is passed through to processor 100 and is analyzed by a next state program. The next state program, stored in embedded ROM, monitors the ringing cadences of the remote phone to determine whether the remote phone is still ringing. The next state machine program run by processor 100 will detect either the ringing cadence energy, which is one second on, two seconds off, or it will see a busy signal cadence, or more importantly, it will detect the unstable energy of human voice.

Energy is the only stable quantity on a telephone line. Voltage, frequency, tones and distortion may all vary. However, all telephone circuits are designed for zero DBM or minus nine DBM in North America. When a person speaks on a phone line and their voice is transmitted through the subscriber line to connector 205, a very unstable energy state is detected by processor 100 through DTMF transceiver 110.

When processor 100 senses, through DTMF transceiver 110, that the ringing cadence on the remote phone has ceased and that an unstable energy state similar to a human voice is present on the line, processor 100 determines that the phone has been answered and it ceases the ringing of the local phone through connector 205. Therefore, when processor 100 detects the sharp short energy spikes that are indicative of human voice cadences, processor 100 will cease using signal RING PULSE to generate ringing cadences on output line EXT DC.

Additionally, processor 100 monitors the ringing cadences of the remote phone on connector 205 to count the number of rings on the remote telephone. In a preferred embodiment of the present invention, the present invention may hang up the connection to the remote phone and the local phone after a predetermined number of rings on the remote telephone, for example eight rings. If after eight rings neither the remote phone nor the local phone is answered, processor 100 will break down the bridge of the conference call and hang up the connection to the subscriber line through connector 205. The preferred embodiment of the present invention uses eight rings because in most telephone devices either an answering machine or a voice mail service will pick up on either the local phone or remote phone connection in less than eight rings. If no one answers either the remote phone or the local phone within eight rings, that is generally sufficient indication that there is no one there to answer either of these phones and that there is no automatic answering machine connected to either the remote or the local phone.

After the remote phone is answered and processor 100 has ceased the ringing of the local phone, processor 100 and transceiver 110 continue to monitor connector 205 to the subscriber line through transformer 250 to determine the energy on the subscriber line. Essentially this is done to determine if people are still talking. As long as processor 100 continues to determine that the energy on the subscriber line is unstable, indicating that people are talking, processor 100 will continue to maintain relay 240 in an energized state. If processor 100, through DTMF transceiver 110, detects a clear down cadence, or a busy signal, or a period of silence that exceeds a predetermined value, such as ten seconds, processor 100 will determine that the parties have hung up (or the line is busy) and will respond by clearing down the line in preparation for the next call.

The next situation to be discussed is the case where the user of the present invention wishes to place a call from the local phone which is connected to the present invention. The present invention must allow the local phone to operate normally. When a user picks up the local phone, current is again detected through resistor 263 by optical coupling circuits 261 and 262. Processor 100 will again receive a signal on either EXT OFF H1 or EXT OFF H2 that indicates that the local phone has been picked up to initiate a phone call. Microcircuit 100 will then energize relay 210 using the relay driver transistor 215 to connect the local phone on connector 200 to the subscriber phone line on connector 205. Processor 100 will also activate relay 240 so that it can monitor connector 205 and 200 for DTMF tones. The telephone network will deliver dial tone from the subscriber line on connector 205 which will be heard by the local telephone user through connector 200.

Because relay 240 is closed while the local telephone is being used, processor 100 is able to continually monitor the subscriber line for the presence of DTMF tones and perform another unique feature of the present invention. If the user of the local phone (or the third party's phone) invokes a predetermined combination of keypad numbers, for example "##2", these keystrokes will be detected by processor 100 through transceiver 110 and transformer 250, and processor 100 will initiate a three-way call to the remote phone. Therefore, if the person using the local phone wishes to leave the building, but nonetheless desires to continue the telephone conversation, he or she can invoke keystrokes "##2" (or some other predetermined combination). The user will then receive a call from the present invention on their remote phone (i.e., their cellular phone) which he or she will then answer, hang up the local phone, and walk out of the building while continuing to talk on the cellular phone.

In order to do this, processor 100 will take the local phone off-hook by de-energizing relay 210 and then using relay 240 to perform a flash hook for 750 milliseconds. Processor 100 will then dial the predetermined number corresponding to the remote phone that is stored in nonvolatile RAM 115, wait a predetermined length of time for the conference bridge to be set up by the telephone network, and then do another flash hook so that now the conference bridge is set up. Processor 100 will then energize relay 210, which reconnects the local phone back to connector 205 of the subscriber line so that now the local phone is part of the conference call. At this point, both the person using the local phone and the person who originally called the user of the local phone will hear the ringing of the remote phone over the subscriber phone line. The present invention will of course not ring the local phone in this scenario because the local phone is already in use.

The person using the local phone will then hear their cellular phone ringing and will answer the cellular phone. Thereafter, the ringing on the subscriber line will stop and the user of the local phone may hang up the local phone and continue the conversation on the remote cellular phone because the present invention will maintain the conference bridge between the remote cellular phone and the party who originally called, or was called by, the local phone on the subscriber line connected to connector 205. The present invention will continue to stay on the line during the telephone conversation and monitor connector 205 to the subscriber line for silence or for the clear down tones that indicate that the parties have hung up.

The foregoing feature discussed the generation of a conference call to the remote telephone during a conversation between the local telephone and another telephone, whether a calling telephone or a called telephone. A very similar feature may be invoked during a conference call on the subscriber line between the remote telephone and another phone, while the local phone is not in use. If the user of the remote phone (or the party to whom they are talking on the conference call on the subscriber line) invokes a predetermined combination of keypad numbers, for example, "##2" (or some other combination), the present invention will then generate a telephone call to the local telephone on connector 200. Because the present invention is continually monitoring resistor 263 and is continually aware that a conference call is or is not in progress at any given moment on connector 205, the present invention will always be able to determine which telephone instrument, either the local or the remote, it must generate a call to whenever the keystrokes "##2" are received. For example, when a conference call is in progress and no current is detected through resistor 263, the present invention will know that the local phone is not in use and that the remote phone is involved in a conference call with another phone on the subscriber line connected to connector 205. The present invention will therefore ring the local phone connected to connector 200 when the keystrokes "##2" are received. Similarly, when the present invention detects current through resistor 263 (indicating that the local phone is in use) and determines that no conference call is in progress, the present invention will determine that the local phone is engaged in a conversation with another telephone through connector 205 and will generate a three-way conference call to the remote phone when the keystrokes "##2" are received.

Another advantageous feature of the present invention is demonstrated when an incoming call is received on the subscriber line and a conference call is bridged to the remote phone, such as the cellular phone, and the remote cellular phone is answered first. The present invention will nonetheless always enable the local phone to join in as a conference member. The present invention is able to do this because it always monitors the voltage across resistor 263, so that if the local phone is picked up during a telephone conversation, the current running through resistor 263 will be sensed by optical coupler 261 or 262 and thereby inform processor 100 that the local phone has been picked up. Therefore, if the local phone is picked up during a conversation between a calling party and the remote cellular phone, the present invention will merely route the call directly from connector 200 to connector 205 so that the local phone now joins the conference call.

However, it may be desirable in some situations to maintain privacy in a conversation between the remote cellular phone and the calling party on the subscriber line. To do this, one of the parties may invoke the DTMF keystrokes "##9" (or some other predetermined combination) on the keypad of the cellular phone or of the phone used by the calling party. When processor 100, through transceiver 110, detects the DTMF tones, processor 100 will de-energize relay 210 so that the local phone on connector 200 will be connected to the signal EXT DC. Processor 100 will also enable the signal EXT TONE CON and thereby generate the signal TONE INPUT through monostable multivibrator 360 in order to create a busy signal on the signal line EXT DC which is connected to the local phone on connector 200.

When the signal EXT TONE CON is at a low voltage, monostable multivibrator 360 is held in the reset position so that the output pin "O" is low. The low DC output on pin "O" of monostable multivibrator 360 is isolated from the signal TONE INPUT by AC coupling capacitor 364. When the signal EXT TONE CON is set high by processor 100 monostable multivibrator 360 begins to generate a 1 kilohertz waveform that is determined by the RC time constant of resistors 361 and 362 and capacitor 363. The 1 kilohertz AC output of monostable multivibrator 360 is capacitively coupled by capacitor 364 to the signal TONE INPUT, which is applied to the base of transistor 310. By pulsing the base of transistor 310 high and low, the signal TONE INPUT drives the signal EXT DC high and low at a rate of 1 kilohertz through diode 320. The 1 kilohertz waveform on signal EXT DC is the busy signal heard on the local phone connected to connector 200. Therefore, when the local phone is picked up after the security function has been invoked by the either remote phone or the third party's phone connected on the subscriber line, the local phone will only hear a busy signal and will not be able to eavesdrop on the call.

Also shown in FIG. 3 is an indicator LED 380 which informs anyone seeing the present invention that the box is powered up and that a phone call is in progress. When the present invention is turned on, the LED 380 is a steady green light. If either the local phone or the remote phone is being used to communicate with another party, LED 380 will flash one second on, one second off to indicate that the present invention is active. Therefore if a person entering the room where the present invention and the local phone are located sees the present invention and sees that LED 380 is flashing, that person will know that the remote phone is being used via the conference call feature of the present invention to talk with another party over the subscriber line connected to connector 205.

The present invention also has the ability to allow the user to change the predetermined telephone number of the remote telephone that is dialed when the conference call feature of the present invention is invoked. The user of the present invention may enter an access code, for example "##6", that will allow the user of the present invention to then enter the new telephone number of the remote phone that is to be called when the next incoming telephone call is received on the present invention. Furthermore, the present invention allows a user to impose a security feature that will not allow the preprogrammed phone number of the remote telephone to be changed without the further invocation of a four digit to six digit security number that must first be invoked prior to changing the stored telephone number. Processor 100 reads the value of an I.D. number unique to each device stored in RAM 115 by the chip maker. Processor 100 then reads a second number stored in the embedded ROM of processor 100 and performs a mathematical algorithm to calculate the security number. This is done to prevent the substitution of compatible RAM chips into stolen devices. After entering the access code, for example "##6", a person must then enter the security number prior to entering the new telephone number of the remote telephone to be called.

An additional feature of the present invention is the ability to store additional remote telephone numbers to be dialed by the present invention when a predetermined pattern of "DTMF" tones are entered on the keypad of either the local phone or the remote phone. The present invention will allow the storage of a primary remote phone number as well as the storage of secondary remote phone numbers that may be called. For example if a person has two or more cellular phones, he or she may invoke a predetermined keystroke (for example, "##7" or "5") during a phone call on the present invention which will cause processor 100 to thereafter dial the phone number of the secondary remote phone that is stored in the nonvolatile RAM 115 of the present invention. The reverse is also true, a secondary remote phone may initiate calls to the primary remote phone by invocation of the predetermined keystrokes. In this way, a user of the present invention can have telephone calls routed to the remote cellular phone that she carries with her on her person, or the remote cellular phone which is in her automobile. The nonvolatile RAM 115** used to store the telephone numbers of the remote telephones are removable chips that may be precoded by the manufacturer and plugged in or removed from the present invention on demand.

Although the present invention and its advantages have been described in detail, it should be understood that various changes, substitutions and alterations can be made herein without departing from the spirit and scope of the invention as defined by the appended claims.

APPENDIX A

```
    /* Init system */
    #include "hardware.inc"
5   #include "ds5000.inc"

/* declare variables */ unsigned int RING_DET
10
    unsigned int  clear_down
    unsigned int  place_call
    unsigned int  number
    unsigned int  wait
15  unsigned int  dial_tone
    unsigned char call_status
    unsigned char DTMF_CHR
    unsigned char DTMF_ST
    unsigned char DTMF_COM
20  unsigned char input_key unsigned int ENERGY_ST
    unsigned int last_energy_st
    unsigned int ENERGY_LO_SEC
25  unsigned int ENERGY_LO_MSEC
    unsigned int ENERGY_HI_SEC
    unsigned int ENERGY_HI_MSEC unsigned int RING_ST
30  unsigned int RING_FREQ
    unsigned int ring_hi
    unsigned int ring_lo
    unsigned int RING_EXT
    unsigned int RING_EXT_1
35  unsigned int EXT_ST
    unsigned int EXT_MON
    unsigned int EXT_MON1 unsigned int fax_swt
40  unsigned int beep_st unsigned int LED_FREQ
```

```
unsigned int LED_FLASH unsigned int BUSY_FREQ
unsigned int BUSY_TONE string Phone_number_1$(16)
string Phone_number_2$(16)
unsigned int number_count
unsigned int twincall_num
unsigned int twin_com /***********************************************************************
 *                                                                     *
 *         Reset all devices, set interrupts and go on hook            *
 *                                                                     *
 ***********************************************************************/

10  ring_det = 0
30  energy_lo_msec = 0
/* set timer interrupt for 10mS (mod asm file to 10ms ints)*/
40  time = 0 :msec=0: ontime 1, Time_interrupt: clock1
50  gosub init_hardware /***********************************************************************
 *                                                                     *
 *                        Main Program                                 *
 *                                                                     *
 ***********************************************************************/
Input_inst:
/* print software version (to be removed from product)*/
60  ?
70  ?"            copyright VoxCom Inc 1994"
80  ?"                TwinCall V1.3"
90  ?
100 goto main
120 end main:
200  do
210     ? "wait ring"
220     ring_det = 0
230     do                      /* wait for ring */
```

```
        #asm
                clr   a
                mov   DPTR, #__EXT_ST
                movx  a, @DPTR
                mov   DPTR, #__RING_DET
                JB    RING_MON,skip
                mov   A, #01H
        skip:
                movx  @DPTR, A
        #asm_end
        290     while ring_det = 0
        300     ?"ring detected or ext off hook"
        310     led_flash = 1
        320     if ext_st = 0 then
        330         gosub off_hook
        340         if fax_swt = 1 then
        350            wait = 650 : gosub pause
        360         endif
        370         wait = 25: gosub pause
        380         gosub call_second_num
        390         ring_lo = 0 : ring_hi = 0 : ring_st = 0 : ring_ext = 1: ring_ext_1 = 0
        400         call_status = 1
        410     else
        420         call_status = 0
        430         gosub off_hook
        440         gosub ext_on_hook
        450     endif
        460     gosub reset_energy_det
        470     do
        480         gosub call_in_prog
        490     while clear_down <> 0
        500     ring_ext = 0
        510     ? "clear down"
        520     gosub ext_off_hook
        530     gosub on_hook
        540     if fax_swt = 1 then
        550        wait = 200 : gosub pause
        560     endif
        570     wait = 10 : gosub pause
        580     led_flash = 0
        590     busy_tone = 0
```

```
600     ring_det = 0
610     twin_com = 0
620     dtmf_com = 0
630     while 1
999     return
```

```
/***********************************************************************
*                                                                      *
*                          Utilities                                   *
*                                                                      *
*       Monitor_call returns call status of 4 for answer               *
*       call_in_prog controls off hook of both numbers                 *
*       commands    manages DTMF commands from phones                  *
*       flash_hook  Generates standard POTS flash                      *
*       wait_dial_tone Waits for at least 75ms of continues high energy *
*       off_hook    Drives P1.0 high turns off tel rly and LED         *
*       on_hook     Drives P1.0 low      " on  "   "   "   "           *
*       check_ring  Test P1.4 for ring detect, returns ring_det TRUE (1) *
*       DTMF_Dial   dial single number with 50 mS pulses               *
*       Dial_number dials twincall number                              *
*       Pause       will return after wait * 10 mS                     *
*                                                                      *
***********************************************************************/

/*
monitor_call monitors the lines for activity and returns current status status:
        0   Unknown state usually during the beginning stage
        1   possibly ringing
        2   definitely ringing
        3   possibly answered
        4   definitely answered
*/
monitor_call:
2000    if energy_st <> last_energy_st then
2010       ? "st begin ", call_status," t = ", time
2020       last_energy_st = energy_st
2030       if energy_st = 0 then
2040          ? "h t = ", energy_hi_sec.".", energy_hi_msec
2050          if call_status < 4 then
2060             gosub energy_status
```

```
2070        endif
2080      else        /*   energy is low    */
2090        ? "l t = ", energy_lo_sec,".", energy_lo_msec
2100      endif
2110    ? "st end ", call_status
2120  endif
2130  if energy_lo_sec >= 10 then
2140    ? " silence "
2150    clear_down = 0
2160  endif
2170  if energy_hi_sec >= 10 then
2180    ? " cont tone "
2190    clear_down = 0
2200  endif
2210  if call_status <> 5 then
2220    if time >= 4000 then
2230      ? " time out "
2240      clear_down = 0
2250    endif
2260  endif
2999  return energy_status:
3000  if energy_hi_sec = 0   then
3010    if energy_hi_msec < 80 then
3020      call_status = call_status + 1    /* a  */
3040      if energy_hi_msec > 45 then
3050        if energy_hi_msec < 55 then
3060          call_status = 1
3070        endif
3080      endif
3090    endif
3100  else
3110    if energy_hi_sec <= 2 then
3120      call_status = 1   /* r   */
3130    endif
3140  endif
3199  return
```

```
/********************************************************************* on hook management for both called and internal ext

*********************************************************************/ call_in_prog:
   4000   gosub monitor_call
   4010   if dtmf_chr <> 0 then
   4020      ? "dtmf number = ", DTMF_CHR
   4030      gosub commands
   4040   endif
   4050   if call_status = 4 then
   4060      ring_ext = 0
   4070      gosub ext_on_hook
   4080      call_status = 5
   4090   else
   4100      if call_status <> 5 then
   4110         if ext_st = 1 then
   4120            if call_status <> 0 then
   4130               gosub flash_hook    /* hang up conference call */
   4140            else
   4150               call_status = 1
   4160            endif
   4170            ?"ext answer"
   4180            gosub off_hook
   4190            gosub ext_on_hook
   4200            wait = 100 : gosub pause
   4210            ext_st = 1
   4220            do
   4230               if dtmf_chr <> 0 then
   4240                  ? "dtmf number = ", DTMF_CHR
   4250                  gosub commands
   4260               endif
   4270            while ext_st = 1
   4280            if call_status <> 5 then clear_down = 0
   4290               ?"ext hang up"
   4300            endif
   4310         endif
   4320      endif
   4999   return
```

```
/******************************************************************

DTMF Commands and number management

******************************************************************/ commands:
5000    on dtmf_com gosub first_dtmf, Second_dtmf, third_dtmf, number_change
5010    dtmf_chr = 0
5020    return first_dtmf:
second_dtmf:
5030    if dtmf_chr = 12 then
5040        dtmf_com = dtmf_com + 1
5050    else
5060        if dtmf_chr = 11 then
5070            dtmf_com = dtmf_com + 1
5080            twin_com = twin_com + 1
5090        else
5100            dtmf_com = 0
5110            twin_com = 0
5120        endif
5130    endif
5140    return third_dtmf:
5200    if twin_com = 2 then
5210        twincall_num = dtmf_chr
5220        ?" CMD - twin call no = ", DTMF_CHR
5230        twin_com = 0
5240        dtmf_com = 0
5245        gosub beep
5250    else
5260        if dtmf_chr = 1 then
5270            if call_status = 5 then
5280                ?" CMD - Ext bridge "
5290                gosub ext_off_hook  /* alow ext ring */
5300                busy_tone = 0
5310                ring_ext = 1
5320                ring_ext_1 = 1
5330            else
```

```
5340            ?" CMD - call second number "
5350            gosub ext_off_hook
5360            gosub call_second_num
5370            gosub ext_on_hook
5380            call_status = 5
5390            ext_st = 0
5400          endif
5410          gosub beep
5420        endif
5430        if dtmf_chr = 5 then
5440          ?" CMD - private off "
5450          gosub ext_on_hook
5460          busy_tone = 0
5470          gosub beep
5480        endif
5490        if dtmf_chr = 6 then
5500          ?" CMD - fax switch "
5510          fax_swt = 1
5520          gosub beep
5530        endif
5540        if dtmf_chr = 7 then
5550          ?" CMD - no fax switch "
5560          fax_swt = 0
5570          gosub beep
5580        endif
5590        if dtmf_chr = 9 then
5600          ?" CMD - private "
5610          gosub ext_off_hook
5620          busy_tone = 1
5630          ?" ring ext = ", ring_ext
5640          gosub beep
5650        endif
5660        twin_com = 0
5670        dtmf_com = 0
5680        if dtmf_chr = 2 then
5690          dtmf_com = 3
5700          number_count = 0
5710          ?" CMD - enter number "
5720          gosub beep
5730        endif
5740      endif
5999    return
```

```
number_change:
6000    ? "number change"
6010    if dtmf_chr > 10 then
6020        dtmf_com = 0
6030        dtmf_chr = 0
6035        gosub beep
6040    endif
6050    if twincall_num = 1 then
6060        ASC(Phone_number_1$(number_count)) = dtmf_chr
6070    else
6080        ASC(Phone_number_2$(number_count)) = dtmf_chr
6090    endif
6100    number_count = number_count + 1
6110    ?"number count = ",number_count
6120    return call_second_num:
7000    gosub flash_hook
7010    gosub wait_dial_tone
7020    gosub dial_number_st
7030    wait = 100 : gosub pause
7040    gosub flash_hook
7050    return

/********************************************************************* general utilities

*********************************************************************/
flash_hook:
8000    gosub on_hook
8010    ?"flash"
8020    wait = 50
8030    gosub pause
8040    gosub off_hook
8050    return wait_dial_tone:
8100    ? "wait dial_tone"
8110    dial_tone = 0
```

```
8120    energy_hi_sec = 0
8130    energy_hi_msec = 0
8140    time = 0 :msec=0: ontime 1, Time_interrupt
8150    clock1
8160    last_energy_st = energy_st
8170    do
8180    while energy_hi_msec < 75
8190    ? "dial tone":
8200    return on_hook:
8300
#asm
        clr   HOOK_SWT
#asm_end
8310    return off_hook:
8320
#asm
        setb  HOOK_SWT
#asm_end
8330    return ext_on_hook:
8340
#asm
        clr   EXT_HOOK_SWT
#asm_end
8360    return ext_off_hook:
8370
#asm
        setb  EXT_HOOK_SWT
#asm_end
8390    return /*
check_ring:
8400    RING=0
#asm
```

```
            clr   a
            JB    RING_MON,skip
            mov   DPTR, #__RING
            mov   A, #01H
     skip:
            movx  @DPTR, A
    #asm_end
    8410    ring_det = RING
    8420    return
    */ pause:
    8500    time = 0 :msec=0: ontime 1, Time_interrupt
    8510    do
    8520    while time < wait
    8530    return beep:
    8540    beep_st = 1
    8550    number = 5
    8560    gosub dial_number
    8570    beep_st = 0
    8580    dtmf_chr = 0
    8590    return dial_number_st:
    8600    ? "dial number"
    8610    number_count = 0
    8620    do
    8630       if twincall_num = 1 then
    8640          number = asc (phone_number_1$(number_count))
    8650       else
    8660          number = asc (phone_number_2$(number_count))
    8670       endif
    8680       number_count = number_count + 1
    8690       if number <> 0 then
    8700          ?"num = ", number
    8710          gosub dial_number
    8720       endif
    8730    while number <> 0
    8740    number=12          /* add final # to number */
```

```
      8750   gosub dial_number
      8760   return dial_number:
      8800
      #asm
             mov   DPTR, #__NUMBER
             movx  a, @DPTR
             mov   p0, a
      10     clr   DTMF_LT_RST  ; latch data
      #asm_end
      8810   if beep_st = 1 then
      8820      wait = 50
      8830   else
      8840      wait = 5
      8850   endif
      8860   gosub pause
      #asm
             setb DTMF_LT_RST
             mov   a,#0ffh
             mov   p0, a
      #asm_end
      8870   wait = 5
      8880   gosub pause
      8890   return reset_energy_det:
      8950   energy_hi_sec = 0: energy_hi_msec = 0
      8960   energy_lo_sec = 0: energy_lo_msec = 0
      8970   place_call = 1: clear_down = 1
      8980   time = 0 :msec=0: ontime 1, Time_interrupt: clock1
      8990   return
```

```
/************************************************************************
*                                                                       *
*                       Hardware configurations                         *
*                                                                       *
*                       Set up DTMF Chip                                *
*                                                                       *
*                                                                       *
************************************************************************/
```

```
       init_hardware:
       9000    gosub on_hook
       9010    gosub ext_on_hook
       9020    led_flash = 0
       9030    ring_ext = 0 asm
               clr    EX0
               clr    EX1
               clr    EXT_TONE_CON
               setb   RING_PULSE
                  setb   EXT_HOOK_SWT
                  clr    EXT_DC
       #asm_end /* set up DTMF chip */
       #asm
               setb   LED_CON      ; set LED ON
               setb   DTMF_DE      ; set DE pin
               setb   DTMF_LT_RST  ; set latch and reset
       #asm_end
       9050    ?"reset time out"
       9060    wait = 100
       9070    gosub pause
       9080    ?"reset finished"
       9090    return /*******************************************************************
 *                                                                 *
 *                        Interrupts                               *
 *                                                                 *
 *       Timer int                                                 *
 *       External int                                              *
 *                                                                 *
 *******************************************************************/

/* timer interrupt */

Time_interrupt:
```

```
        9100
        #asm
                setb    TEST_PIN
                jnb     DTMF_DET, _NO_ENERGY_DET
                mov     DPTR, #__ENERGY_ST
                    movx    a, @DPTR
                cjne    a, #0h , _INC_COUNTER
                mov     a, #01h
                    movx    @DPTR, a
                clr     a
                mov     DPTR, #__ENERGY_HI_SEC
                    movx    @DPTR, a
                mov     DPTR, #__ENERGY_HI_MSEC
                    movx    @DPTR, a
                ljmp    _INC_COUNTER
        _NO_ENERGY_DET:
                mov     DPTR, #__ENERGY_ST
                    movx    a, @DPTR
                cjne    a, #1 , _INC_COUNTER
                mov     a, #0h
                    movx    @DPTR, a
                clr     a
                mov     DPTR, #__ENERGY_LO_SEC
                    movx    @DPTR, a
                mov     DPTR, #__ENERGY_LO_MSEC
                    movx    @DPTR, a

_INC_COUNTER:

mov     DPTR, #__ENERGY_ST
                    movx    a, @DPTR
                cjne    a, #1h , _INC_LOW_COUNTER ; inc high energy counter mov     DPTR, #__ENERGY_HI_MSEC
                    movx    a, @DPTR
                inc     a
                cjne    a, #100, _INC_HI_ENERGY_SEC
                mov     DPTR, #__ENERGY_HI_SEC
                    movx    a, @DPTR
                inc     a
```

```
                movx    @DPTR, a
                mov     DPTR, #__ENERGY_HI_MSEC
                clr     a
        _INC_HI_ENERGY_SEC:
  5             movx    @DPTR, a
                ljmp    _END_ENERGY_DET _INC_LOW_COUNTER:
                mov     DPTR, #__ENERGY_LO_MSEC
 10             movx    a, @DPTR
                inc     a
                cjne    a, #100, _INC_LO_ENERGY_SEC
                mov     DPTR, #__ENERGY_LO_SEC
                movx    a, @DPTR
 15             inc     a
                movx    @DPTR, a
                mov     DPTR, #__ENERGY_LO_MSEC
                clr     a
        _INC_LO_ENERGY_SEC:
 20             movx    @DPTR, a _END_ENERGY_DET:
        #asm_end 25
        /*      extension phone off hook detection    */
        9110
        #asm
                mov     DPTR, #__EXT_MON
 30             clr     a
                JB      EXT_OFF_H1, _EXT_ON_H1
                mov     a, #01H
        _EXT_ON_H1:
                JB      EXT_OFF_H2, _EXT_ON_H2
 35             mov     a, #01H
        _EXT_ON_H2:
                movx    @DPTR, A
        #asm_end
        9130    if ext_mon = 1 then
 40     9140        if ext_mon1 <= 10 then
        9150            ext_mon1 = ext_mon1 + 1
        9160        endif
```

```
9170    else
9180        if ext_mon1 > 0 then
9190            ext_mon1 = ext_mon1 - 1
9200        endif
9210    endif
9220    if ext_mon1 > 2  then
9230        if ext_st = 0 then
9240            ext_mon1 = 30
9250        endif
9260        ext_st = 1
9270    else
9280        ext_st = 0
9290    endif
9300    if ring_ext_1 <> 0 then
9310        if ext_st = 1 then
#asm
            clr    EXT_HOOK_SWT
#asm_end
9320            ring_ext_1 = 0
9330        endif
9340    endif /*              check DTMF tone       */

9350    if dtmf_st = 0 then
#asm
            clr    a
            mov    DPTR, #_DTMF_CHR
            JNB    DTMF_DEV.dtmf_skip
            clr    DTMF_DE
            mov    a, p0
            anl    a, #0fh
            setb   DTMF_DE
dtmf_skip:
            movx   @DPTR, a
#asm_end
9360        if dtmf_chr <> 0 then
9370            dtmf_st = 1
9380        endif
9390    else
#asm
            JB     DTMF_DEV.dtmf_skip_1
```

```
                clr     a
                mov     DPTR, #__DTMF_ST
                movx    @DPTR, a
        dtmf_skip_1:
    #asm_end
    9400    endif /*      FLASH led       */

9410    if led_flash = 1 then
    #asm
                mov     DPTR, #__LED_FREQ
                movx    a, @DPTR
                inc     a
                cjne    a, #25, _END_LED_CYCLE ; frequency of PULSE
                clr     a
                jb      LED_CON, _CLR_LED
                setb    LED_CON
                ljmp    _END_LED_CYCLE
        _CLR_LED:
                clr     LED_CON
        _END_LED_CYCLE:
                movx    @DPTR, a
    #asm_end
    9420    else
    9430        led_freq = 0
    #asm
                setb    LED_CON
    #asm_end
    9440    endif /*      busy tone       */

9450    if busy_tone = 1 then
    #asm
                mov     DPTR, #__BUSY_FREQ
                movx    a, @DPTR
                inc     a
                cjne    a, #50, _END_TONE_CYCLE ; frequency of PULSE
                clr     a
                jb      EXT_TONE_CON, _CLR_TONE
                setb    EXT_TONE_CON
```

```
                    ljmp    _END_TONE_CYCLE
        _CLR_TONE:
                    clr     EXT_TONE_CON
        _END_TONE_CYCLE:
                    movx    @DPTR, a
        #asm_end
        9460    else
        9470        busy_freq = 0
        #asm
                    clr     EXT_TONE_CON
        #asm_end
        9480    endif /*      ring cycle generation       */
        9490    if ext_st = 1 then
        #asm
                    setb    RING_PULSE          ; turns off 200v chip
                    clr     EXT_DC              ; this turns on DC smoothing
        #asm_end
        9500        ring_ext   = 0
        9510        ring_ext_1 = 0
        9520    endif
        9530    if ring_ext = 1 then
        9540        if ring_st = 1 then
        9550            if ring_hi <= 150 then
        9560                if ring_ext_1 = 1 then
        9570                    ring_hi = ring_hi + 4
        9580                else
        9590                    ring_hi = ring_hi + 1
        9600                endif
        #asm
                    mov     DPTR, #_RING_FREQ
                        movx a, @DPTR
                    inc     a
                    cjne    a, #2, _END_RING_CYCLE ; frequency of ring
                    clr     a
        _RING_CYCLE:                                ; send ring pulses
                    jb      RING_PULSE, _CLR_RING_PULSE
                    setb    RING_PULSE          ; this turns off 200v chip
                    setb    EXT_DC              ; this turns off DC smoothing pulls
                                                ; sig to ground
                    ljmp    _END_RING_CYCLE
```

```
_CLR_RING_PULSE:
            clr   EXT_DC              ; this turns on DC smoothing
            clr   RING_PULSE          ; this turns on 200v chip
_END_RING_CYCLE:
            movx  @DPTR, a
            mov   DPTR, #__RING_FREQ asm_end
9610        else
#asm
            setb  RING_PULSE          ; turns off 200v chip
            clr   EXT_DC              ; this turns on DC smoothing
#asm_end
9620        ring_st = 0               /* set status to low  */
9630        ring_lo = 0               /* 3.5 sec of silence */
9640      endif
9650    else                          /* status is low      */
9660      if ring_lo <= 350 then
9670        if ring_ext_1 = 1 then
9680          ring_lo = ring_lo + 2
9690        else
9700          ring_lo = ring_lo + 1
9710        endif
9720      else
#asm
            clr   EXT_DC              ; this turns on DC smoothing
#asm_end
9730        ring_freq=0
9740        ring_st = 1
9750        ring_hi = 0               /* 2 sec of ring */
9760      endif
9770    endif
9780  endif
9790  if energy_hi_sec >= 30 then energy_hi_sec = 30
9800  if energy_lo_sec >= 30 then energy_lo_sec = 30
9810  if time >= 10000 then time = 10000
9820  ontime time + 1, time_interrupt
#asm
      clr   TEST_PIN
#asm_end
9999  reti
```

What is claimed is:

1. A telephone device operable to receive an incoming call from a calling telephone instrument on a subscriber telephone line coupled to said telephone device and to connect said incoming call to a first telephone instrument coupled to said telephone device and to connect said incoming call to a selected second telephone instrument, said telephone device comprising:

means for initiating and maintaining a three-way conference connection on said subscriber telephone line between said calling telephone instrument, said telephone device, and said second telephone instrument, said three-way conference connection initiated by said incoming call directed to said subscriber telephone line;

monitoring and connecting means for monitoring said first telephone instrument during said three-way conference connection, applying a locally generated ringing cadence, and connecting said first telephone instrument to said three-way conference connection when said monitoring detects that said first telephone instrument is answered;

transceiver means coupled to said first telephone instrument and said subscriber telephone line operable to monitor energy signals from said telephone subscriber line and said first telephone instrument, said energy signals including DTMF inputs, dial tones, busy signals, ringing cadences and telephone line energy, and to generate DTMF tones in response to said detection of said monitored energy signals;

a digital processor coupled to said transceiver means, said digital processor operable to receive input signals from said first telephone instrument and said transceiver means and to generate outputs to said first telephone instrument and said transceiver means under control instructions stored in an electronic memory, said stored control instructions operable to control said three-way conference connection means, said monitoring and connecting means, said transceiver means and said first telephone instrument; and circuitry coupled to and controlled by said digital processor for generating ringing cadences and busy signals for communication to said first telephone instrument.

2. The telephone device in claim 1 wherein said generated ringing cadence is controlled by a ringing cadence sent to said selected second telephone instrument as a result of said three-way conference connection.

3. The telephone device in claim 1 wherein said electronic memory is comprised of a first nonvolatile memory embedded in said digital processor containing said stored control instructions and a second nonvolatile memory coupled to said digital processor, said second nonvolatile memory containing data corresponding to telephone numbers of one or more remote telephone instruments.

4. The telephone device in claim 1 wherein said control instructions stored in said electronic memory further include data corresponding to a first pattern of DTMF tones received over said subscriber telephone line, said first pattern of DTMF tones operable under control of said processor to generate a busy signal for communication to said first telephone instrument if said first telephone instrument is picked up during said conference call and to prevent said processor from connecting said first telephone instrument to said conference call.

5. The telephone device in claim 1 wherein said control instructions stored in said electronic memory further include data corresponding to a second pattern of DTMF tones received from said first telephone instrument or said subscriber telephone line, said second pattern of DTMF tones operable under control of said processor to cause said telephone device to initiate and maintain conference calls with a selected telephone instrument other than said second telephone instrument when a next incoming call is received, said selected other telephone instrument being designated by DTMF tones corresponding to the telephone number of said selected other telephone instrument received from said subscriber telephone line or said first telephone instrument after the receipt of said second DTMF pattern.

6. The telephone device in claim 5 wherein said control instructions stored in said electronic memory further include security code data corresponding to a third pattern of DTMF tones received from said first telephone instrument or from said subscriber telephone line, said security code data operable under control of said processor to prevent said second pattern of DTMF tones from causing said processor to initiate and maintain said conference calls with said selected other telephone instrument other than said second telephone instrument unless said third pattern of DTMF tones is received by said telephone device immediately after said second pattern of DTMF tones.

7. The telephone device in claim 1 wherein said control instructions stored in said electronic memory further include data corresponding to a fourth pattern of DTMF tones received from said first telephone instrument or said subscriber telephone line during a call involving said first telephone instrument, said fourth pattern of DTMF tones operable under control of said processor to initiate and maintain a conference call with said second telephone instrument.

8. The method of controlling an incoming telephone call from a calling telephone instrument directed to a called telephone instrument so that the incoming call may be answered by the called instrument or by a selected one of a plurality of other telephone instruments, each having a unique called number identification, the method comprising the steps of:

receiving the incoming call at a telephone device coupled to the called telephone instrument;

initiating a three-way conference call on the incoming telephone line between the calling phone instrument, the telephone device and a first selected other telephone instrument; and determining when ringing cadence is being applied to the first selected other telephone instrument, and in response to said determination, immediately applying a locally generated ringing cadence to the called telephone instrument.

9. The method set forth in claim 8 further including the steps of:

terminating the conference call to the first selected other telephone instrument if the called telephone instrument is answered first; and maintaining the conference call between the first selected other telephone instrument and the calling telephone instrument if the first selected other telephone instrument is answered first.

10. The method set forth in claim 9 further including the steps of:

monitoring the called telephone instrument and connecting it to the conference call if the called telephone instrument is picked up during the conference call between the calling instrument and the first selected other telephone instrument.

11. The method as set forth in claim 10, the method including, whenever the first selected other telephone instrument is answered first, the further steps of:

receiving from the incoming telephone line input in the form of a first pattern of DTMF tones, the first pattern of DTMF tones operable to cause the telephone device to generate a busy signal on the called telephone instrument if the called telephone instrument is subsequently picked up and to prevent the telephone device from connecting the called telephone instrument to the conference call.

12. The method set forth in claim 10 further including the steps of:

receiving from the called telephone instrument or the incoming telephone line input in the form of a second pattern of DTMF tones, the second pattern of DTMF tones operable to cause the telephone device to initiate and maintain a conference call with a second selected other telephone instrument other than the first selected telephone instrument when the next incoming call is received, the second selected other telephone instrument being designated by DTMF tones corresponding to the telephone number of the second selected other telephone instrument received from the called telephone instrument or the incoming telephone line after the receipt of the second pattern of DTMF tones.

13. The method forth in claim 12, further including the steps of:

receiving from the called telephone instrument or the incoming telephone line input in the form of security code data corresponding to a third pattern of DTMF tones, the security code data operable to prevent the second pattern of DTMF tones from causing the telephone device to initiate and maintain a conference call with a second selected telephone instrument other than the first selected telephone instrument unless the third pattern of DTMF tones is entered immediately after the second pattern of DTMF tones.

14. The method set forth in claim 10 including, whenever the called telephone instrument is answered first or used to make an outbound call, the further steps of:

receiving from the called telephone instrument or the incoming telephone line input in the form of a fourth pattern of DTMF tones, the fourth pattern of DTMF tones operable to cause the telephone device to initiate and maintain a conference call with the first selected telephone instrument.

15. The method set forth in claim 8 further including the step of delaying the ringing of the called telephone instrument.

16. The method of controlling an incoming telephone call from a calling telephone instrument directed to a called telephone instrument so that the incoming call may be answered by the called instrument or by a selected one of a plurality of other telephone instruments, each having a unique called number identification, the method comprising the steps of:

receiving the incoming call at a telephone device coupled to the called telephone instrument;

initiating and maintaining a three-way conference call on the incoming telephone line between the calling phone instrument, the telephone device and a first selected other telephone instrument;

determining when ringing cadence is being applied to the first selected other telephone instrument and, in response to said determination, immediately applying a locally generated ringing cadence to the called telephone instrument; and monitoring the called telephone instrument during the three-way conference call and connecting the called telephone instrument to the three way conference call when the monitoring detects that the called telephone instrument is answered.

17. The method set forth in claim 16 further including the step of delaying the applying of the ringing cadence to the called telephone instrument.

18. The method set forth in claim 16 further including the steps of:

terminating the conference call to the first selected other telephone instrument if the called telephone instrument is answered first; and maintaining the conference call between the first selected other telephone instrument and the calling telephone instrument if the first selected other telephone instrument is answered first.

19. The method set forth in claim 18 further including the steps of:

continuing to monitor the called telephone instrument and connecting it to the conference call if the called telephone instrument is picked up during the conference call between the calling instrument and the first selected other telephone instrument.

20. The method as set forth in claim 19, the method including, whenever the first selected other telephone instrument is answered first, the further steps of:

receiving from the incoming telephone line input in the form of a first pattern of DTMF tones, the first pattern of DTMF tones operable to cause the telephone device to generate a busy signal on the called telephone instrument if the called telephone instrument is subsequently picked up and to prevent the telephone device from connecting the called telephone instrument to the conference call.

21. The method set forth in claim 20 further including the steps of:

receiving from the called telephone instrument or the incoming telephone line input in the form of a second pattern of DTMF tones, the second pattern of DTMF tones operable to cause the telephone device to initiate and maintain a conference call with a second selected other telephone instrument other than the first selected telephone instrument when a next incoming call is received, the second selected other telephone instrument being designated by DTMF tones corresponding to the telephone number of the second selected other telephone instrument received from the called telephone instrument or the incoming telephone line after the receipt of the second pattern of DTMF tones.

22. The method set forth in claim 21, further including the steps of:

receiving from the called telephone instrument or the incoming telephone line input in the form of security code data corresponding to a third pattern of DTMF tones, the security code data operable to prevent the second pattern of DTMF tones from causing the telephone device to initiate and maintain a conference call with a second selected telephone instrument other than the first selected telephone instrument unless the third pattern of DTMF tones is entered immediately after the second pattern of DTMF tones.

23. The method set forth in claim 19 including, whenever the called telephone instrument is answered first or used to make an outbound call, the further steps of:

receiving from the called telephone instrument or the incoming telephone line input in the form of a fourth pattern of DTMF tones, the fourth pattern of DTMF tones operable to cause the telephone device to initiate and maintain a conference call with the first selected telephone instrument.

* * * * *